(12) United States Patent
Uhlhorn et al.

(10) Patent No.: US 7,962,036 B1
(45) Date of Patent: Jun. 14, 2011

(54) FIBER OPTIC NETWORK ADJUSTMENT

(75) Inventors: Brian L. Uhlhorn, St. Paul, MN (US);
Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 771 days.

(21) Appl. No.: 11/978,392

(22) Filed: Oct. 29, 2007

(51) Int. Cl.
*H04B 10/20* (2006.01)
*H04J 14/00* (2006.01)

(52) U.S. Cl. .......................................... 398/61
(58) Field of Classification Search ............ 398/58, 398/61, 63
See application file for complete search history.

(56) References Cited

U.S. PATENT DOCUMENTS

| | | | |
|---|---|---|---|
| 4,712,859 A | 12/1987 | Albanese et al. | |
| 5,515,361 A | 5/1996 | Li et al. | |
| 5,739,935 A * | 4/1998 | Sabella | 398/50 |
| 5,801,861 A * | 9/1998 | Majima | 398/95 |
| 7,046,929 B1 | 5/2006 | Hester et al. | |
| 7,072,582 B2 | 7/2006 | Stevens | |

* cited by examiner

*Primary Examiner* — Shi K Li
(74) *Attorney, Agent, or Firm* — Brooks, Cameron & Huebsch PLLC

(57) ABSTRACT

A number of fiber optic networks, nodes, and methods are disclosed. One fiber optic network embodiment includes a network module including a star coupler for receiving a signal from a number of nodes and outputting a combined signal, including the received signals, to the number of nodes, and the number of nodes optically connected to the network module, the number of nodes including a transmit module including a first adjustable optical amplifier and a number of optical emitters, a receive module including a second adjustable optical amplifier and a number of receivers, and a controller coupled to the transmit and receive modules for adjusting the first and second optical amplifiers in response to the combined signal.

19 Claims, 6 Drawing Sheets

FIBER OPTIC NETWORK ADJUSTMENT

FIELD OF THE DISCLOSURE

The present disclosure relates to optical communication. In particular, the present disclosure relates to fiber optic network adjustment.

BACKGROUND

In the field of optical communication, information is typically encoded onto a light beam in order to create an optical signal that is encoded with information that can be transferred from one device to another via an interconnection device within a fiber optic network of a particular architecture. Situations where a communications system or apparatus is exposed to harsh environmental conditions such as extreme high or low temperatures, extreme changes in temperature, exposure to high radiation levels, large amounts of shock forces, unstable environments, or other such environments, may create issues with component reliability and/or durability, among other issues.

Various approaches to providing a fiber optic network have focused on architectures related to commercial and/or telecommunication applications such as ring architectures. However, such architectures may not have the additional information and/or adjustment capabilities available in other network architectures such as a broadcast star fiber optic network that could be utilized in some situations.

Some implementations of broadcast star fiber optic networks have utilized a single optical power amplification setting at a particular margin above a minimum effective setting to account for variations in network components. These networks are preset and diagnostics may be performed by a technician that accesses the system. Having a technician perform such diagnostics may lead to certain amounts of downtime for the network before a fault is detected, in some instances.

Some networks provide self-setting optical power levels for data transmission for point-to-point fiber optic or free space optical links and have focused on setting power at the transmitter. Such diagnostic approaches can involve external equipment and/or have a cost associated with integration into current modules.

SUMMARY

The present disclosure includes a number of fiber optic networks, optical network nodes, and method embodiments. Such embodiments can be utilized, for example, in aircraft, watercraft, spacecraft, and landcraft (e.g., motorized ground vehicles), among other embodiments. The use of a broadcast star optical network as described in the various embodiments herein can assist some network components in self-tuning and provide diagnostics on the state of one or more network components.

As stated above, the present disclosure includes a number of network embodiments. For example, in some embodiments, the network can include a network module including a star coupler that can be utilized for receiving a signal from a number of nodes and outputting a combined signal, including received signals, to the number of nodes. In such systems, the number of nodes can, for example, be optically connected to the network module.

In various embodiments, the number of nodes can include a transmit module with a first adjustable optical amplifier and a number of optical emitters. Such nodes also include a receive module with a second adjustable optical amplifier and a number of receivers. The number of nodes can further include a controller coupled to the transmit and/or receive modules that can be utilized for adjusting the first and/or second optical amplifiers in response to the combined signal.

In some embodiments, the network can include a controller that can be utilized to adjust the first optical amplifier such that a signal transmitted by the transmit module includes a number of channels at a particular power level. For example, a particular power level can be approximately equal to an average power level of a plurality of channels included in the combined signal, among other level calculations.

In various embodiments, the controller can adjust the second optical amplifier such that a plurality of channels included in the combined signal are amplified to a power level within an operating range for the number of receivers. For example, the controller can increase amplification when the power levels of the channels in the combined signal are below the operating range for the number of receivers so that the number of receivers can correctly receive and process the optical signal.

In some instances, the controller can decrease amplification when the power levels of the channels in the combined signal are above the operating range for the number of receivers. Increasing and/or decreasing amplification of the optical signal to bring the power level of the channels within an operating range of the number of receivers can, for example, help provide a more accurate reading of the optical signal by the receivers.

Network embodiments can include a controller that diagnoses and/or flags hard faults and/or latent faults associated with the fiber optic network. For example, hard faults can include one or more inoperable optical emitters, one or more inoperable upstream connectors, and/or one or more inoperable downstream connectors, among others. Latent faults can include, for instance, one or more weakened optical emitters and/or one or more weakened optical amplifiers, among others. These features can be useful in reducing the effects of component variation and/or in aiding to isolate faults in the fiber optic network to guide preventative maintenance, thereby increasing availability of the network and/or network components, among other uses.

In some embodiments, the controller can boost the first optical amplifier after diagnosing one or more weakened optical emitters. In various embodiments, the controller can boost the one or more optical amplifiers after diagnosing that the one or more optical amplifiers are weakened. These features can be useful, for example, in providing an optical signal at a desired power level although one or more components are weakened.

As discussed above, the present disclosure also includes a number of fiber optic network node embodiments. For example, in some embodiments, the network node includes a transmit module with a number of optical emitters multiplexed by a coupler to a first optical amplifier that can be utilized for transmitting a first optical signal.

The network node embodiment also includes a receive module with a second optical amplifier for receiving, amplifying, and/or sending a second optical signal to a number of receivers via a demultiplexer. In such embodiments, the network node also includes a controller that can be utilized for adjusting the first and second optical amplifiers, diagnosing faults, and/or flagging faults for repair.

In various embodiments, the first optical signal can include a first number of channels, and the second optical signal can include a second number of channels. In such embodiments, the controller can adjust the first amplifier such that a power level of the first number of channels is approximately equal to an average power level of the second number of channels. For instance, in such embodiments, the controller can adjust the second amplifier such that power levels of the second number of channels are within an operating range of the number of receivers, for example, to help provide for a more accurate reading by the number of receivers, among other benefits.

In some embodiments, the controller can diagnose and/or flag a faulty optical emitter according to a power level of a channel associated with the optical emitter relative to one or more power levels of other channels in the second optical signal. In various embodiments, the controller can diagnose and/or flag a faulty first optical amplifier according to power levels of one or more channels associated with the first optical emitter relative to power levels of one or more other channels in the second optical signal. Such features can be useful in improving network and component reliability, among other benefits.

The present disclosure also includes a number of method embodiments. In some embodiments, the method includes receiving, with a particular network node, an optical signal from a star coupler including an output of a number of network nodes coupled to the star coupler. Using a star coupler can, for example, provide a particular network node with information from other nodes in the network, providing an increased information base for adjusting one or more settings for the particular network node to operate more efficiently, according to one or more embodiments of the present disclosure.

Method embodiments can include adjusting an optical transmission power level for the particular network node to be substantially equal to an average transmission power level for the output of the number of network nodes coupled to the star coupler. Setting the optical transmission power level at the average can, for example, increase a likelihood that a transmitted optical signal may fall within an operating range of a number of receivers associated with network nodes that receive the signal, thereby increasing likelihood that the optical signal may be received correctly. Among other benefits, such embodiments can increase network reliability.

In one or more embodiments, a method can include adjusting optical amplification of the optical signal received from the star coupler such that a number of channels included in the optical signal are within an operating range for a number of receivers associated with the particular network node. As described above, such embodiments can, for example, help provide for a more accurate reading of an optical signal by the number of receivers.

In some embodiments, a method can include diagnosing an inoperable transmit laser in the particular node when a channel associated with the laser is indicated by a substantially zero power level in the optical signal received from the star coupler. Diagnosing an inoperable transmit later can, for example, allow the laser to be flagged for repair, which can decrease an amount of down-time for laser by highlighting the defect for technicians.

In various embodiments, a method can include diagnosing an other network node as being absent from the fiber optic network when a number of channels associated with the other network node are indicated by a substantially zero power level in the optical signal received from the star coupler. Such embodiments can be beneficial, among other benefits, in flagging the other network node for repair to a technician.

In various embodiments, a method includes boosting the optical transmission power level for a channel when the channel is indicated by a power level substantially less than other channels associated with the particular node in the optical signal received from the star coupler. Such methods can be useful, for example, in improving the quality of a transmitted optical signal, among other benefits.

In some embodiments, a method includes boosting the optical transmission power level for all channels associated with the particular node when all channels associated with the particular node are indicated by a substantially lower power level than channels associated with other network nodes in the optical signal received from the star coupler. In such embodiments, a method can include diagnosing fouled upstream connectors and/or flagging the upstream connectors for repair. For instance, method embodiments can include diagnosing that the transmission optical amplifier is beginning to fail and/or flagging the amplifier for repair, for example, when the transmission optical amplifier is boosted to a maximum level and/or all channels associated with the particular node are indicated by a substantially lower power level than channels associated with other network nodes in the optical signal received from the star coupler.

In various embodiments, a method can include boosting the optical reception power level when substantially all channels associated with substantially all nodes are indicated by a power level less than the operating range for the number of receivers associated with the particular node in the optical signal received from the star coupler. Such embodiments can include diagnosing fouled downstream connectors and/or flagging the downstream connectors for repair. Some embodiments can include diagnosing that the reception optical amplifier is beginning to fail and/or flagging the amplifier for repair, for example, when the reception optical amplifier is boosted to a maximum level and/or substantially all channels associated with substantially all nodes are indicated by a power level less than the operating range for the number of receivers associated with the particular node in the optical signal received from the star coupler.

DETAILED DESCRIPTION

Figure 1:
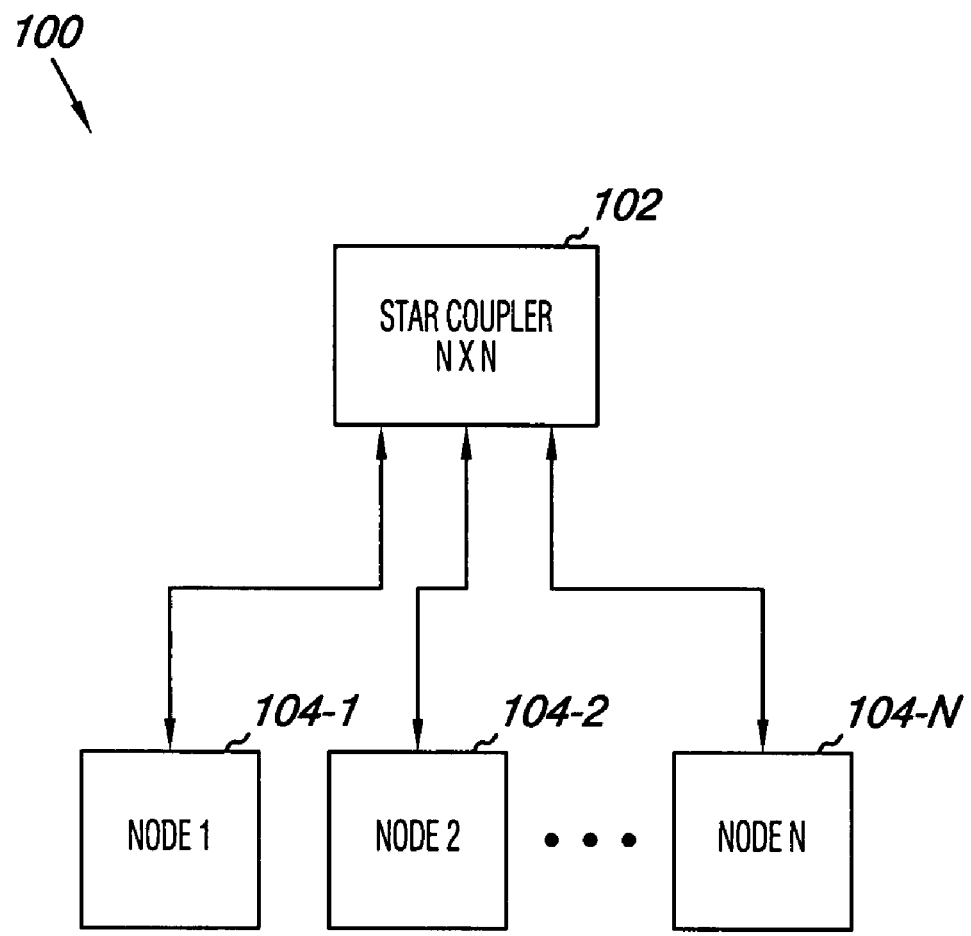
FIG. 1 is an illustration of an optical network having a star coupler and a number of nodes according to an embodiment of the present disclosure.

The present disclosure includes a number of method, network, and node embodiments. Embodiments of the present disclosure will now be described in relation to the accompanying drawings, which will at least assist in illustrating various features of the various embodiments.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, and/or eliminated so as to provide a number of additional embodiments. In addition, discussion of features and/or attributes for an element with respect to one figure can also apply to the element shown in one or more additional figures.

FIG. 1 is an illustration of an optical network having a star coupler and a number of nodes according to an embodiment of the present disclosure. One suitable type of interconnection for various embodiments of the present disclosure is a star interconnect. However, a few interconnection types are discussed below to allow the reader to become more familiar with the concepts of the types before the discussion of the embodiment of FIG. 1.

Generally, networks allow information to be sent to, shared with, passed on, or bypassed within a number of nodes (e.g., computing devices or other network devices). This can be facilitated through use of a server (e.g., a main computing device that can direct traffic on the network).

Network types, for example, include local area networks (LANs), metropolitan area networks (MANs), and wide area networks (WANs), among other network types. Networks can also be designed to provide intra-vehicle/building or inter-vehicle/building communications, broadcast distribution, intelligent transportation systems (ITS), telecommunications, supervisory control and data acquisition (SCADA) networks, and other types of communications between two or more devices.

In addition to the different types of networks, networks can be configured in a number of interconnection types. These include bus interconnections, with or without a backbone, star interconnections, ring interconnections, which can be redundant and/or self-healing, other types of interconnections, or some combination of these.

Generally, a bus interconnection, (e.g., daisy-chain) has each node connected on a main transmission line. At one end is a controller and at the other end is a terminator.

Any node that wants to talk to the server has to wait its turn for access to the transmission line. In such networks, only one node can communicate at a time.

When a node uses the network, the information is sent to the controller, which then sends the information down the line of nodes until it reaches the terminating node. In such networks each computing device in the line receives the same information.

A bus network with a backbone operates in the same fashion, but each node has an individual connection to the network. A bus with a backbone interconnection offers greater reliability than a bus type interconnection. In a bus interconnection, if one node in the network goes down, the network is broken. A backbone adds reliability in that the loss of one node may not disrupt the entire network.

Star networks incorporate multi-port star interconnects which utilize a main controlling node to interconnect with all the other nodes in the network. As with the bus with a backbone interconnection, the failure of one node may not cause a failure in the network.

One type of star interconnection is called a passive fiber-optic star interconnection and distributes all incoming light, on the input ports, to all output ports. In some embodiments, a star coupler can be utilized where information from one or more inputs can be coupled (e.g., combined). This type of interconnect will be discussed in more detail with respect to FIGS. 1 and 2.

Ring interconnections operate like bus interconnections with the exception of a terminating node. Ring interconnections utilize nodes in a ring link to a main communication cable. In some embodiments, a ring coupler can be utilized where information from one or more inputs can be coupled (e.g., combined).

Ring interconnections typically utilize tokens containing information requested by one or more nodes on the network. The token passes around the ring until the requesting node(s) have received the data.

Tokens can be designed to use a packet of information that serves as an address for the node that requested the information. The node then "empties" the token, which continues to travel the ring until another node requests information to be put into the token.

One type of ring interconnection uses two communication cables sending information in both directions. Such an interconnection is sometimes referred to as a counter-rotating ring, this creates a fault tolerant network that can redirect transmission in the other direction, should a node on the network detect a disruption in a first direction. Such an interconnection type can use a fiber optic transceiver, one controlling unit in set in "master" mode, and several nodes that have been set as "remote" units.

In such interconnection arrangements, the first remote data transceiver receives the transmission from a master unit and re-transmits it to a next remote unit as well as transmitting it back to the master unit. An interruption in the signal line on the first ring can be bypassed via the second ring, allowing the network to maintain integrity.

As stated above, FIG. 1 is an illustration of an optical network having a star coupler and a number of nodes according to an embodiment of the present disclosure. In the embodiment illustrated in FIG. 1, the optical network 100 includes a star coupler 102 and a number of optical network nodes 104-1, 104-2, and 104-N. The designator N is used to indicate that any number of optical network nodes can be included with the network 100.

In the embodiment of FIG. 1, information from one optical network node (e.g., node 104-1) can be passed to one or more other optical network nodes (e.g., node 104-2). In the embodiment of FIG. 1, the network illustrated is a passive star interconnect network. A passive fiber optic star interconnect network distributes all incoming light (i.e., optical signals), on the input ports, to all output ports (e.g., outputs to all of the optical network nodes).

A network with the logical function of a bus can also be obtained by such a network interconnect type by connecting the transmitting and receiving side of each node to one input and output fiber of the interconnect node, respectively. By using wavelength division multiplexing (WDM), multiple wavelength (e.g., color of light) channels can be used to carry information simultaneously through the network 100.

In some embodiments, each optical network node can transmit on a particular wavelength, or within a wavelength range, that is unique to the optical network node. In some embodiments, a number of receivers each within, or associated with, an optical network node can listen to one or more wavelengths to receive information on the various wavelengths.

Figure 2:
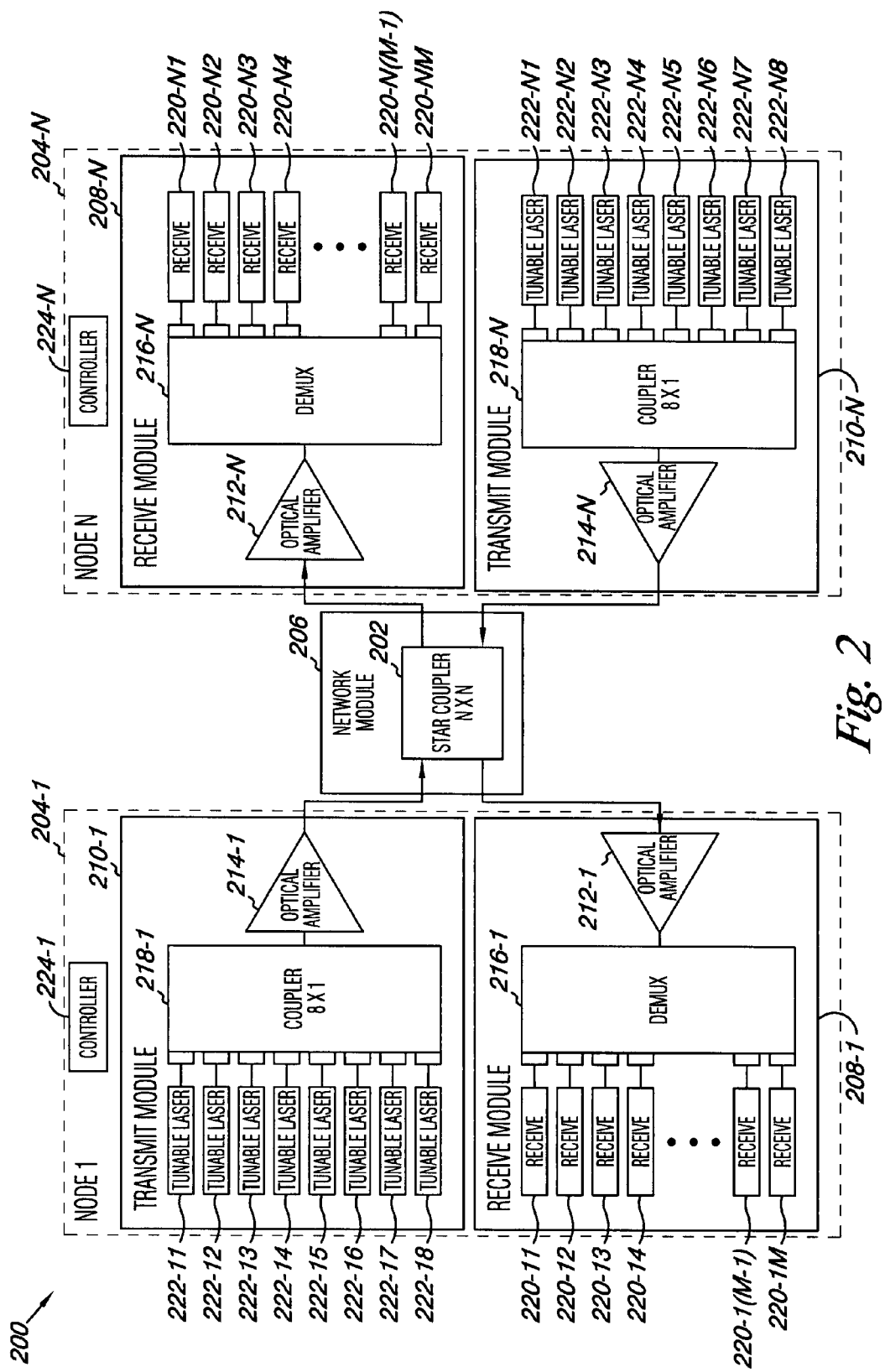
FIG. 2 is an illustration of an optical network including a star coupler and a number of nodes including transmit and receive modules according to an embodiment of the present disclosure.

FIG. 2 is an illustration of an optical network including a star coupler and a number of nodes including transmit and receive modules according to an embodiment of the present disclosure. In the embodiment of FIG. 2, the illustration of the optical network 200 focuses on two optical network nodes 204-1 (e.g., optical network node 104-1 of FIG. 1) and 204-N (e.g., the optical network node 104-N of FIG. 1) and the network module 206 including star coupler 202 (e.g., star coupler 102 of FIG. 1).

In the embodiment illustrated in FIG. 2, each optical network node 204-1, 204-N includes a controller 224-1, 224-N for controlling the various components of each network node 204-1, 204-N, including but not limited to receive modules 208-1, 208-N and transmit modules 210-1, 210-N.

In the illustrated embodiment of FIG. 2, each network node 204-1, 204-N includes a receive module 208-1, 208-N. Each receive module 208-1, 208-N can receive an optical signal from the star coupler 202, for example, in the network module 206.

An optical signal received by receive modules 208-1, 208-N can be input to an optical amplifier 212-1, 212-N. Optical amplifiers 212-1, 212-N can be adjustable (e.g., adjustable gain) by controllers 224-1, 224-N. Optical amplifiers 212-1, 212-N can be adjusted by controllers 224-1, 224-N to either boost or reduce amplification of the power of a received optical signal such that it is within an operating range of a number of receivers for the receive module.

Receive modules 208-1, 208-N include demultiplexers 216-1, 216-N for distributing the optical signals to their various destinations within the receive module. Demultiplexers 216-1, 216-N can receive an amplified optical signal from optical amplifiers 212-1, 212-N. For example, suitable mechanisms for distributing optical signals can include one or more arrayed waveguide gratings (AWGs), film filters (e.g., thin films), Bragg filters, and/or other suitable mechanisms for separating optical signals. In the embodiment of FIG. 2, the demultiplexers 216-1, 216-N can be utilized to direct a particular wavelength from a particular optical signal to a particular destination.

A particular destination can include one or more receivers. In the embodiment of FIG. 2, receive module 208-1 includes receivers 220-11, 220-12, 220-13, 220-14, 220-1(M−1), 220-1M. Receive module 208-N includes receivers 220-N1, 220-N2, 220-N3, 220-N4, 220-N(M−1), 220-NM. The designator M indicates that any number of receivers can be included in a receive module 208-1, 208-N.

In various embodiments, each receiver (e.g., 220-11) can be configured to receive a particular wavelength or wavelength range from the amplified optical signal at a particular power level or power level range. Such embodiments can be useful, for example, for receiving a number of channels from one optical signal according to one or more embodiments of the present disclosure.

It should be noted that in various embodiments, more or less of the components described with respect to the receive modules 208-1, 208-N can be utilized and that one or more of such components can be provided independent of the transmitter and/or an optical network node (e.g., in another network device, as independent components, or in independent components).

In the embodiment illustrated in FIG. 2, each optical network node 204-1, 204-N includes a transmit module 210-1, 210-N. Each transmit module 210-1, 210-N can transmit an optical signal to the star coupler 202 in the network module 206. The optical signal can be provided, for example, by an optical emitter as a light source (e.g., a laser) generating a light beam directed into an optical fiber, among other such components that can provide an optical signal.

Accordingly, in the embodiment illustrated in FIG. 2, eight tunable lasers provided for the transmit modules 210-1, 210-N. In such embodiments, the wavelength range of each laser can be a single wavelength or can be a range including more than one wavelength.

In the embodiment of FIG. 2, transmit module 210-1 includes tunable lasers 222-11, 222-12, 222-13, 222-14, 222-15, 222-16, 222-17, and 222-18. Transmit module 210-N includes tunable lasers 222-N1, 222-N2, 222-N3, 222-N4, 222-N5, 222-N6, 222-N7, and 222-N8.

Embodiments are not limited to having eight lasers in a transmit module. For instance, in some embodiments, the optical signal may be generated by a single light source and can be split into a number of light beam segments (e.g., of different wavelength ranges). This can be accomplished by a beam splitter, for example. In such embodiments, the one or more light sources and/or one or more beam splitters can be independent of the transmit modules 210-1, 210-N.

In various embodiments, encoding the information to be transmitted as the optical signals can be accomplished in any suitable manner. For example, one or more modulators, such as Electro-Absorption Modulators (EAMs) and/or Mach-Zehnder Modulators (MZMs) can be utilized, in various embodiments. In some embodiments, such as that illustrated in FIG. 2, the one or more lasers themselves can be modulated (i.e., direct modulation) to encode the information onto the light beams in order to form the optical signals to be transmitted.

Once information is encoded on the light beam segments, thereby forming optical signals, the optical signals can then be directed toward the couplers 218-1, 218-N. Couplers 218-1, 218-N can function to multiplex optical signals received from each tunable laser (e.g., tunable laser 222-11) into one optical signal for transmitting to star coupler 202 in network module 206.

An optical signal transmitted by transmit modules 210-1, 210-N can be output from an optical amplifier 214-1, 214-N. Optical amplifiers 214-1, 214-N can be adjustable (e.g., adjustable gain) by controllers 224-1, 224-N.

Optical amplifiers 214-1, 214-N can be adjusted by controllers 224-1, 224-N to either boost or reduce amplification of the power of a transmitted optical signal such that it is within an average power level range of a number of optical signals transmitted through the star coupler 202. It should be noted that in various embodiments, more or less of the components described with respect to the transmit modules 210-1, 210-N can be utilized and that one or more of such components can be provided independent of the transmitter and/or an optical network node (e.g., may be in another network device or may be independent components).

Figure 3A:
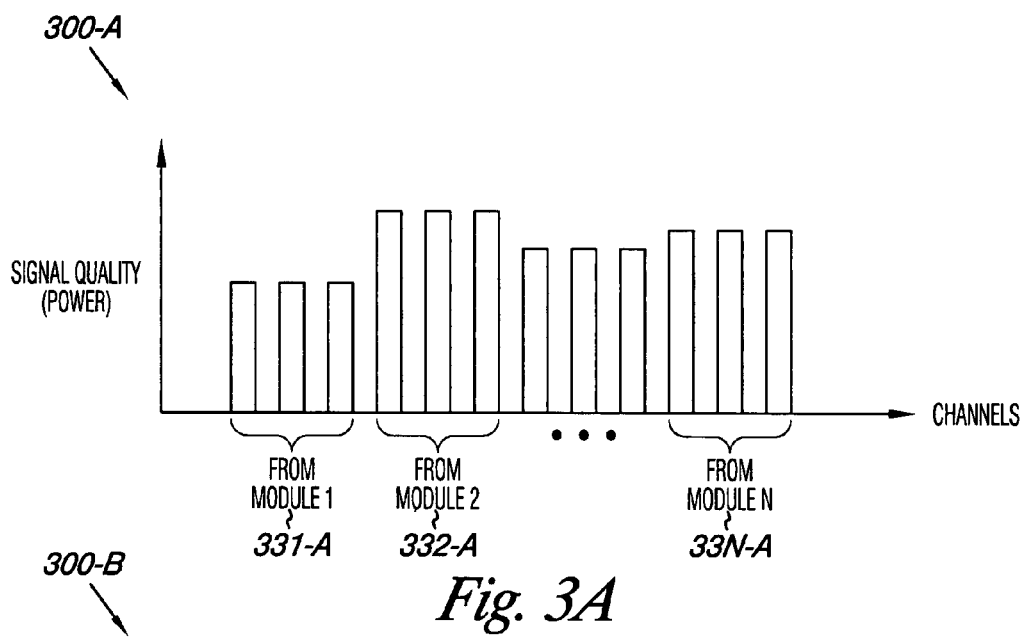
FIGS. 3A-3C are bar graphs representing signal quality for a number of channels for optical amplification setting in a network node of a fiber optic network according to an embodiment of the present disclosure.
Figure 3B:
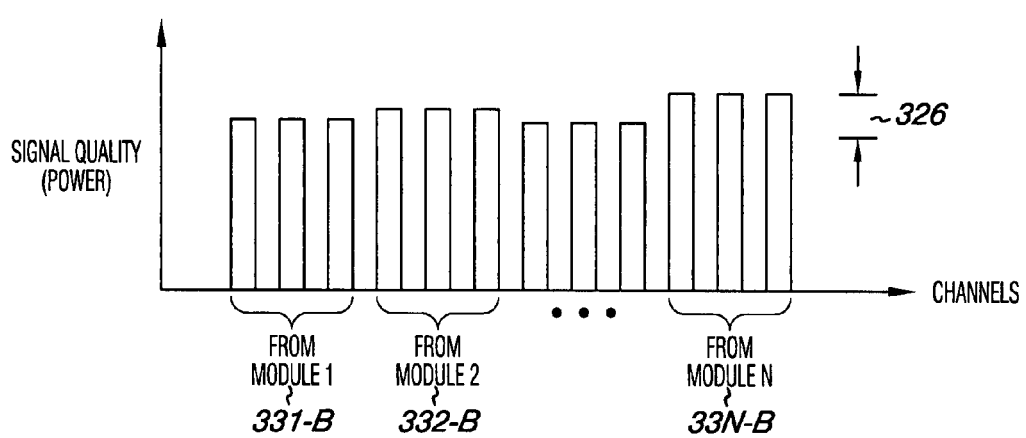
Figure 3C:
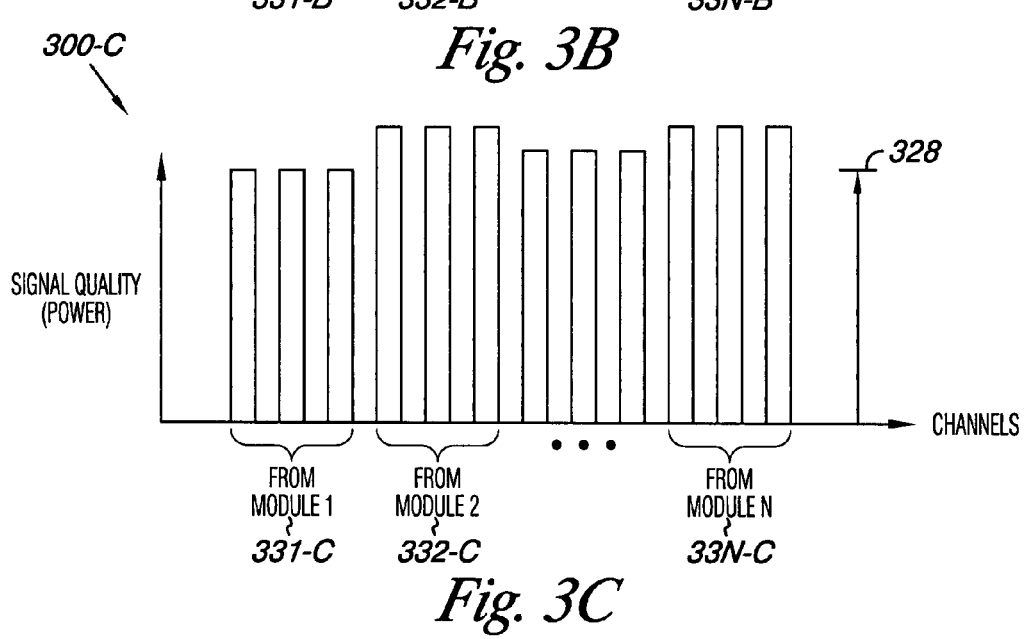

FIGS. 3A-3C are bar graphs representing signal quality for a number of channels for optical amplification setting in a network node of a fiber optic network according to an embodiment of the present disclosure. As illustrated in FIGS. 3A-3C, three channels, indicated by three bars, are included from each of a number of modules.

The designator N is used to indicate that any number of modules may be included in FIGS. 3A-3C. Information represented in FIGS. 3A-3C can be received by each module from a star coupler in a fiber optic star network, such as network 200 in FIG. 2. Embodiments are not limited to three channels per module.

FIG. 3A illustrates a bar graph 300-A depicting signal quality for a number of channels for optical amplification setting in a network node (e.g., node 204-1 in FIG. 2) of a fiber optic network according to an embodiment of the present disclosure. Bar graph 300-A includes a number of channels indicated by bars with varying signal quality (e.g., power).

The information represented in FIG. 3A is a representation of the power levels of a number of channels from a number of modules (e.g., modules 331-A, 332-A, 33N-A) in a fiber optic star network when each of the modules are set to some default amplification level. The number of channels represented in FIG. 3A can be amplified according to one or more embodiments of the present disclosure as will be described below in connection with FIGS. 3B and 3C.

The illustration of FIG. 3B is a bar graph 300-B representing signal power for a number of channels for optical amplification setting in a network node (e.g., node 204-1 in FIG. 2) of a fiber optic network according to an embodiment of the present disclosure. As can be seen from comparing graph 300-B to graph 300-A in FIG. 3A, amplification of channels associated with various modules has been increased and/or decreased in power level to fall within an average range compared to each of the channels from each module 331-B, 332-B, 33N-B, as indicated by average range 326. Such a change in amplification can be accomplished by using a controller (e.g., controller 224-1 in FIG. 2) to adjust the gain of an optical amplifier (e.g., optical amplifier 214-1 in FIG. 2) of a transmit module (e.g., transmit module 210-1 in FIG. 2) of a network node (e.g., network node 204-1 in FIG. 2).

As described above, each network node connected to a star coupler receives each optical signal sent from each other node connected to the star coupler. A controller coupled to a particular node can use the power level of each signal for each node in the network to adjust the amplification of the power level of an optical signal transmitted by the particular node to fall within an average range for the optical network.

FIG. 3C illustrates a bar graph 300-C representing signal quality for a number of channels for optical amplification setting in a network node (e.g., node 204-1 in FIG. 2) of a fiber optic network according to an embodiment of the present disclosure. As can be seen from comparing graph 300-C to graph 300-B in FIG. 3B, amplification of each channel associated with each module (e.g., 331-C, 332-C, 33N-C) has increased to at least a particular level 328.

Particular level 328 can be a minimum operating level for a number of receivers (e.g., receiver 220-11 in FIG. 2) associated with a receive module (e.g., receive module 208-1) in an optical network node (e.g., node 204-1 in FIG. 2). A controller associated with a network node can adjust the amplification of the power level of a received optical signal such that each channel is above the particular level 328.

Such an adjustment can be made to an optical amplifier (e.g., optical amplifier 212-1 in FIG. 2) associated with a receive module (e.g., receive module 208-1 in FIG. 2). As described above, amplifying the power level of an optical signal to be within an operating range of a number of receivers, for example, can help provide a more accurate reading of the optical signal by the receivers, among other benefits.

FIGS. 4A-4D are bar graphs representing signal quality for a number of channels for self-diagnosing hard faults in a network node of a fiber optic network according to an embodiment of the present disclosure. FIGS. 4A-4D include a number of channels indicated by bars with varying signal quality (e.g., power).

As illustrated in FIGS. 4A-4D, three channels, indicated by three bars, are included from each of a number of modules. The designator N is used to indicate that any number of modules may be included in FIGS. 4A-4D.

Information represented in FIGS. 4A-4D can be received by each module from a star coupler in a fiber optic star network, such as network 200 in FIG. 2. Embodiments are not limited to three channels per module.

As used herein, a hard fault is a failure in one or more network components that has disabled that component. As used herein, and described in more detail with respect to FIGS. 5A-5C, a latent fault and/or a soft fault is an indication of a network component that is weakened and/or is in a condition that could lead to a hard failure. As used herein, flagging a fault includes giving an indication of a fault such as providing error messages, activating warning signals (e.g., audible, visual, motion-based, and/or other signals) associated with a network component, and/or other means as will be understood by one of ordinary skill in the art.

Figure 4A:
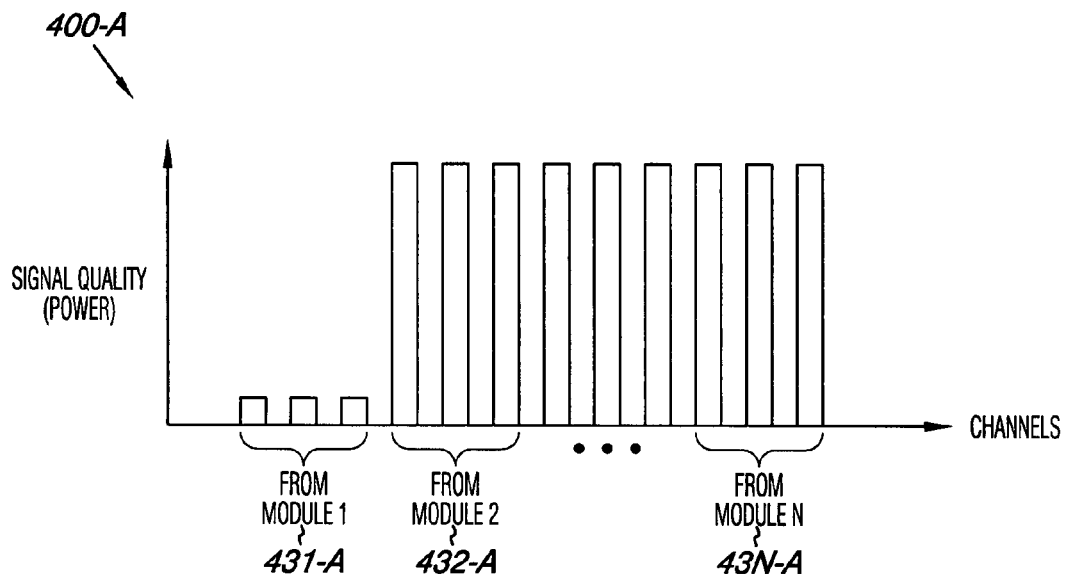
FIGS. 4A-4D are bar graphs representing signal quality for a number of channels for self-diagnosing hard faults in a network node of a fiber optic network according to an embodiment of the present disclosure.

The illustration of FIG. 4A is a bar graph 400-A representing signal quality for a number of channels for self-diagnosing hard faults in a network node (e.g., node 204-1 in FIG. 2) of a fiber optic network (e.g., network 200 in FIG. 2) according to an embodiment of the present disclosure. Graph 400-A indicates a particular power level associated with an optical signal transmitted from module 2 (e.g., 432-A) through module N (e.g., 43N-A). However, module 1 (e.g., 431-A) indicates that all three channels have a substantially zero power level.

A controller associated with module 1 can diagnose and/or flag a hard fault based on the information received from the star coupler, which is represented in graph 400-A. A hard fault, represented by graph 400-A, can include inoperable optical emitters, inoperable upstream connectors, an inoperable optical amplifier in the transmit module, and/or any other of a number of faults that could cause a network node to fail to transmit an optical signal for a number of channels.

Figure 4B:
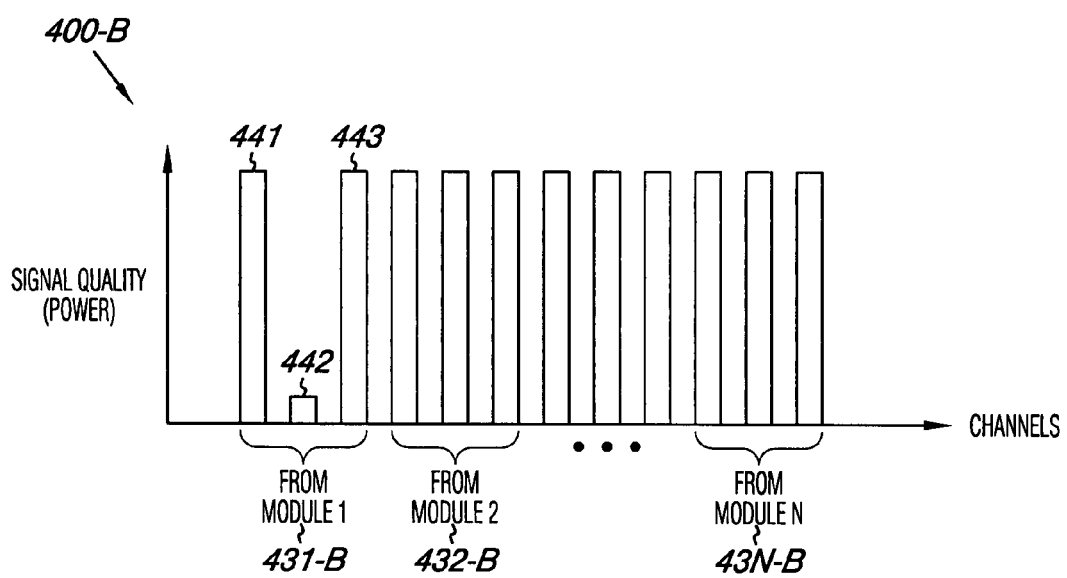

FIG. 4B illustrates a bar graph 400-B representing signal power for a number of channels for self-diagnosing hard faults in network node (e.g., node 204-1 in FIG. 2) of a fiber optic network (e.g., network 200 in FIG. 2) according to one or more embodiments of the present disclosure. Graph 400-B includes three channels 441, 442, and 443 from module 1 (e.g., 431-B).

Channels 441 and 443 are illustrated at substantially the same power level as channels associated with modules 2 (e.g., 432-B) through N (e.g., 43N-B). However, channel 442 is indicated by a substantially zero power level. A substantially zero power level can be a power level that is indicated by a reading of zero or within a deviation from zero small enough that the indication is more likely to be caused by interference or other optical signal variations rather than from an optical signal transmitted by an optical emitter at a weakened power level.

A controller associated with module 1 coupled to the optical network can diagnose and/or flag a hard fault based on the graphical representation of the optical signal received from a star coupler depicted in graph 400-B. A hard fault represented in graph 400-B can include an inoperable optical emitter (e.g., laser) associated with channel 442 in module 1, and/or any other of a number of faults that could cause a network node to fail to transmit an optical signal for a number of channels.

Figure 4C:
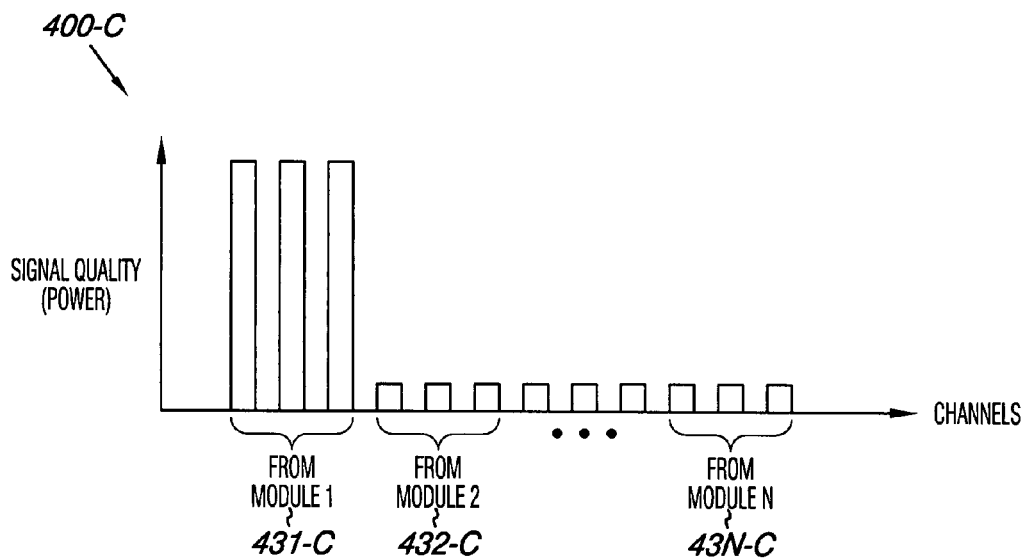

The illustration of FIG. 4C is a bar graph 400-C representing signal quality for a number of channels for self-diagnosing hard faults in a network node (e.g., nodes 204-1 in FIG. 2) of a fiber optic network (e.g., network 200 in FIG. 2) according to an embodiment of the present disclosure. Graph 400-C indicates a particular power level associated with a transmitted optical signal from module 1 (e.g., 431-C). However modules 2 (e.g., 432-C) and N (e.g., 43N-C) indicate a substantially zero power level associated with a number of channels therein.

A controller associated with module 1 coupled to the optical network can diagnose and/or flag a hard fault based on the graphical representation of the optical signal received from a star coupler depicted in graph 400-C. A hard fault represented by graph 400-C can include other modules (e.g., other than module 1) not being present on the network or being inoperable, inoperable upstream connectors from which information is received from other nodes by module 1, and/or any other of a number of faults that could cause a number of network nodes to fail to transmit an optical signal for a number of channels associated therewith.

Figure 4D:
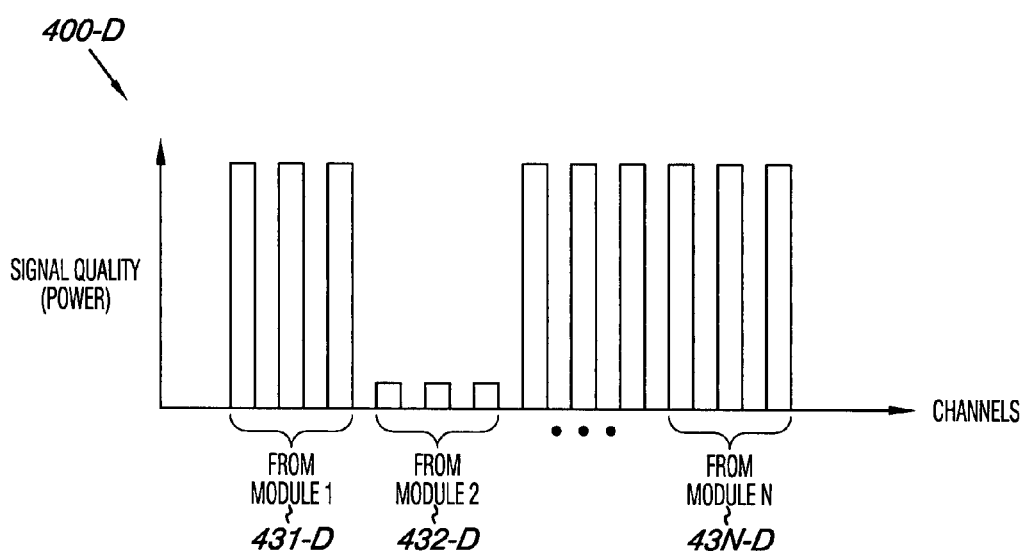

FIG. 4D illustrates a bar graph 400-D representing signal power for a number of channels for self-diagnosing hard faults in a network node (e.g., node 204-1 in FIG. 2) of a fiber optic network (e.g., network 200 in FIG. 2) according to one or more embodiments of the present disclosure. Graph 400-D illustrates a particular power level associated with a transmitted optical signal from modules 1 (e.g., 431-D) and other modules through N (e.g., 43N-D), except module 2 (e.g., 432-D). Module 2 indicates a substantially zero power level associated with a number of channels therein.

A controller associated with module 1 coupled to the optical network can diagnose and/or flag a hard fault based on the graphical representation of the optical signal received from a star coupler depicted in graph 400-D. A hard fault represented in graph 400-D can include module 2 being absent from the network, inoperable upstream connectors, and/or any other of a number of faults that could cause a network node to fail to transmit an optical signal for a number of channels associated therewith.

Figure 5A:
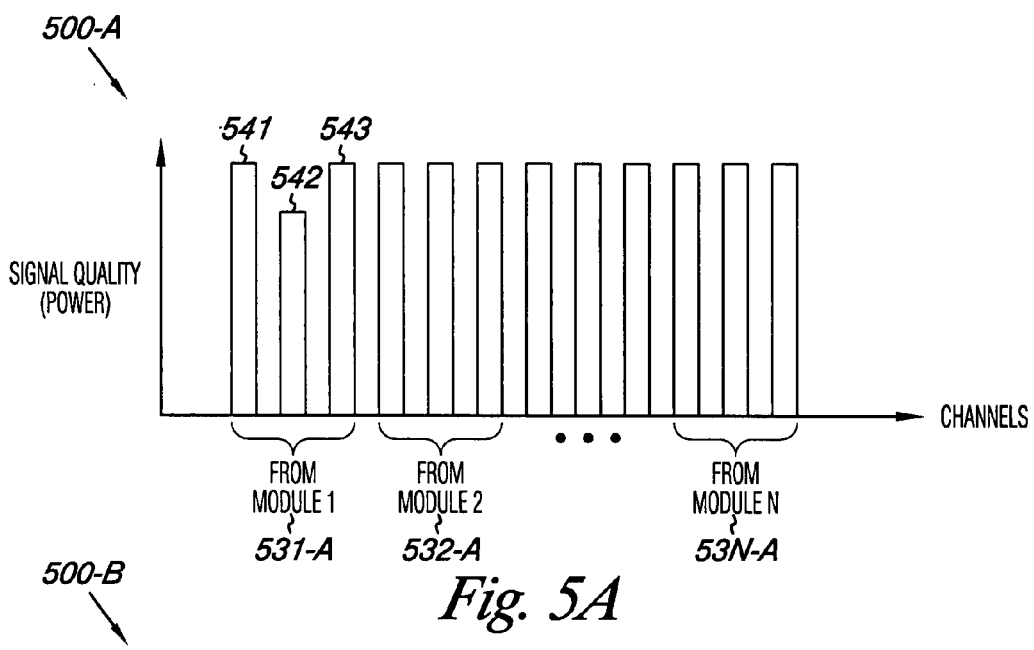
FIGS. 5A-5C are bar graphs representing signal quality for a number of channels for self-diagnosing latent faults in a network node of a fiber optic network according to an embodiment of the present disclosure.
Figure 5B:
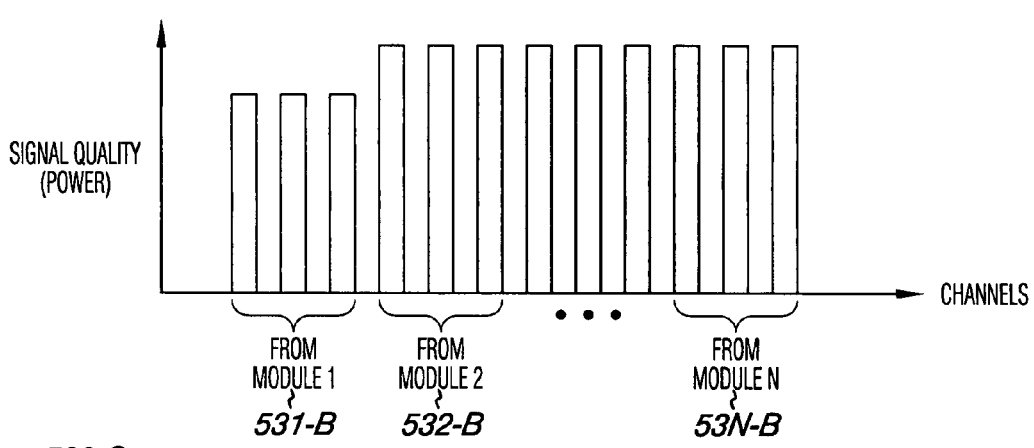
Figure 5C:
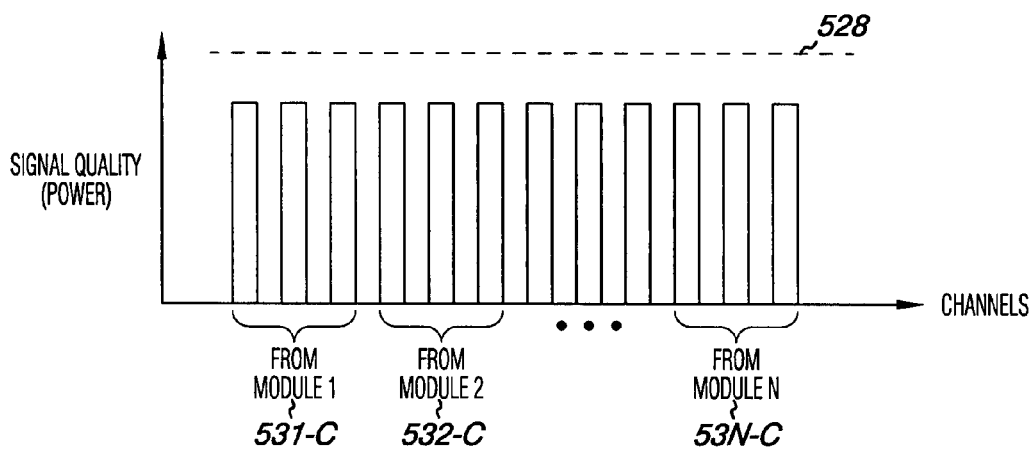

FIGS. 5A-5C are bar graphs representing signal quality for a number of channels for self-diagnosing latent faults in a network node of a fiber optic network according to an embodiment of the present disclosure. FIGS. 5A-5C include a number of channels indicated by bars with varying signal quality (e.g., power).

As illustrated in FIGS. 5A-5C, three channels, indicated by three bars, are included from each of a number of modules. The designator N is used to indicate that any number of modules may be included in FIGS. 5A-5C.

Information represented in FIGS. 5A-5C can be received by each module from a star coupler in a fiber optic star network, such as network 200 in FIG. 2. Embodiments are not limited to three channels per module.

FIG. 5A illustrates a bar graph 500-A representing signal power for a number of channels for self-diagnosing latent faults in a network node (e.g., node 204-1 in FIG. 2) of a fiber optic network (e.g., network 200 in FIG. 2) according to one or more embodiments of the present disclosure. Graph 500-A includes channels 541, 542, and 543 in the optical signal from module 1 (e.g., 531-A). Channels 541 and 543 are substantially equal to other channels from modules 2 (e.g., 532-A) through N (e.g., 53N-A).

However, channel 542 is indicated by a lesser, although non-zero power level. A controller associated with module 1 coupled to the optical network can diagnose and/or flag a latent fault based on the graphical representation of the optical signal received from a star coupler depicted in graph 500-A.

A latent fault represented by graph 500-A can include an optical emitter (e.g., laser) associated with channel 542 being weakened, in a condition that can lead to failure, and/or any other of a number of faults that could cause a network node to transmit an optical signal for one channel at a lesser, but non-zero, power level than other channels associated therewith. Additionally, the controller associated with module 1 can boost the optical amplifier (e.g., optical amplifier 214-1 in FIG. 2) associated with transmission of channel 542. Boosting the transmitting optical amplifier can help to improve the signal quality of channel 542 (e.g., increase the power level of channel 542) until the latent fault can be repaired.

The illustration of FIG. 5B is a bar graph 500-B representing signal quality for a number of channels for self-diagnosing latent faults in a network node (e.g., node 204-1 in FIG. 2) of a fiber optic network (e.g., network 200 in FIG. 2) according to an embodiment of the present disclosure. Graph 500-B indicates a particular power level associated with an optical signal transmitted from modules 2 (e.g., 532-B) through module N (e.g., 53N-B). However, module 1 (e.g., 531-B) indicates that all three channels have a substantially lesser, but non-zero, power level.

A controller associated with module 1 can diagnose and/or flag a latent fault based on the information received from the star coupler and represented in graph 500-B. A latent fault represented by graph 500-B can include a transmit optical amplifier associated with module 1 being weakened, in a condition that can lead to failure, and/or any other of a number of faults that could cause a network node to transmit an optical signal for all channels with a lesser, but non-zero, power level compared to channels transmitted by other network nodes.

Additionally, the controller associated with module 1 can diagnose and/or flag fouled upstream connectors as a cause for all channels transmitted from a particular module (e.g., module 1) having a non-zero power level that is less than other channels transmitted by other modules. The controller can make such a diagnosis when the optical amplifier associated with transmission for module 1 is set at an amplification below maximum. In such an example, the controller can boost the optical amplifier (e.g., optical amplifier 214-1 in FIG. 2) associated with transmission for module 1. Boosting the transmitting optical amplifier can help to improve the signal quality for the number of channels associated with module 1 531-B until the fault can be repaired.

FIG. 5C illustrates a bar graph 500-C representing signal power for a number of channels for self-diagnosing latent faults in a network node (e.g., node 204-1 in FIG. 2) of a fiber optic network (e.g., network 200 in FIG. 2) according to one or more embodiments of the present disclosure. Graph 500-C indicates a particular power level associated with an optical signal transmitted from modules 1 through module N (e.g., 531-C, 532-C, 53N-C). However, all channels are indicated as having a non-zero power level that is substantially less than an operating level 528 and/or range for a number of receivers (e.g., receiver 220-11 in FIG. 2) associated with a module (e.g., receive module 208-1 in FIG. 2).

A controller associated with module 1 can diagnose and/or flag a latent fault based on the information received from the star coupler and represented in graph 500-C. A latent fault represented by graph 500-C can include a receive optical amplifier associated with module 1 being weakened, in a condition that can lead to failure, and/or any other of a number of faults that could cause a network node to receive an optical signal for all channels with a non-zero power level that is less than an operating level and/or range for a number of receivers associated with the module.

Additionally, the controller associated with module 1 can diagnose and/or flag fouled downstream connectors as a cause for all channels received by a particular module (e.g., module 1) having a non-zero power level that is less than an operating level and/or range associated with a number of receivers for the module. The controller can make such a diagnosis when the optical amplifier associated with receiving optical signals for module 1 531-C is set at an amplification below maximum. In such an example, the controller can boost the optical amplifier (e.g., optical amplifier 212-1 in FIG. 2) associated with receiving optical signals for module 1. Boosting the receiving optical amplifier can help to improve the signal quality for the number of channels for receivers associated with module 1 until the fault can be repaired.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A fiber optic network, comprising:
   a network module including a star coupler for receiving a signal from each of a number of nodes and outputting a combined signal, including the received signals, to the number of nodes; and
   the number of nodes optically connected to the network module, the number of nodes each including:
      a transmit module including a first adjustable optical amplifier and a number of optical emitters;
      a receive module including a second adjustable optical amplifier and a number of receivers; and
      a controller coupled to the transmit and receive modules for adjusting the first and second optical amplifiers in response to the combined signal;
   wherein the controller:
      diagnoses hard faults and latent faults associated with the fiber optic network;
      adjusts the first optical amplifier such that a number of channels corresponding to a signal transmitted by the transmit module are at a particular power level; and
      adjusts the second optical amplifier such that each of a number of channels corresponding to the combined signal are at a particular power level within an operating range of the number of receivers.

2. The network of claim 1, where the particular power level of the number of channels corresponding to a signal transmitted by the transmit module is approximately equal to an average power level of a plurality of channels included in the combined signal.

3. The network of claim 1, where the controller diagnoses hard faults selected from the group including:
   one or more inoperable optical emitters;
   one or more inoperable upstream connectors; and
   one or more inoperable downstream connectors.

4. The network of claim 1, where the controller diagnoses and flags latent faults selected from the group including:
   one or more weakened optical emitters; and
   one or more weakened optical amplifiers.

5. The network of claim 4, where the controller boosts the first optical amplifier after diagnosing one or more weakened optical emitters.

6. The network of claim 4, where the controller boosts the one or more optical amplifiers after diagnosing that the one or more optical amplifiers are weakened.

7. A fiber optic network node, comprising:
   a transmit module including a number of optical emitters whose output signals are multiplexed by a coupler to a first adjustable optical amplifier for transmitting a first optical signal having a first number of channels;
   a receive module including a second adjustable optical amplifier for receiving, amplifying, and sending a second optical signal having a second number of channels to a number of receivers via a demultiplexer; and
   a controller for adjusting the first and second optical amplifiers, diagnosing faults, and flagging faults for repair;
   wherein the controller adjusts the first adjustable amplifier such that a power level of the first number of channels is approximately equal to an average power level of the second number of channels.

8. The node of claim 7, where the controller adjusts the second amplifier such that power levels of the second number of channels are within an operating range of the number of receivers.

9. The node of claim 7, where the controller can diagnose and flag a faulty optical emitter according to a power level of a channel associated with the optical emitter relative to power levels of other channels in the second optical signal.

10. The node of claim 7, where the controller can diagnose and flag a faulty first optical amplifier according to power levels of channels associated with the first optical emitter relative to power levels of other channels in the second optical signal.

11. A method for operating a fiber optic network, comprising:
   receiving, with a particular network node, an optical signal from a star coupler, the star coupler receiving an output from each of a number of network nodes coupled to the star coupler;
   adjusting an optical transmission power level for the particular network node to be substantially equal to an average transmission power level for the output of the number of network nodes coupled to the star coupler;
   boosting the optical transmission power level for a channel when the channel is indicated by a power level substantially less than other channels associated with the particular node in the optical signal received from the star coupler; and
   adjusting optical amplification of the optical signal received from the star coupler such that a number of channels included in the optical signal are within an operating range for a number of receivers associated with the particular network node.

12. The method of claim 11, where the method includes diagnosing an inoperable transmit laser in the particular node when a channel associated with the laser is indicated by a substantially zero power level in the optical signal received from the star coupler.

13. The method of claim 11, where the method includes diagnosing an other network node as being absent from the fiber optic network when a number of channels associated with the other network node are indicated by a substantially zero power level in the optical signal received from the star coupler.

14. The method of claim 11, where the method includes boosting the optical transmission power level for all channels associated with the particular node when all channels associated with the particular node are indicated by a substantially lower power level than channels associated with other network nodes in the optical signal received from the star coupler.

15. The method of claim 14, where the method includes diagnosing fouled upstream connectors and flagging the upstream connectors for repair.

16. The method of claim 14, where the method includes diagnosing that the transmission optical amplifier is beginning to fail and flagging the amplifier for repair when the transmission optical amplifier is boosted to a maximum level and all channels associated with the particular node are indicated by a substantially lower power level than channels associated with other network nodes in the optical signal received from the star coupler.

17. The method of claim 11, where the method includes boosting the optical reception power level when substantially all channels associated with substantially all nodes are indicated by a power level less than the operating range for the number of receivers associated with the particular node in the optical signal received from the star coupler.

18. The method of claim 17, where the method includes diagnosing fouled downstream connectors and flagging the downstream connectors for repair.

19. The method of claim 17, where the method includes diagnosing that the reception optical amplifier is beginning to fail and flagging the amplifier for repair when the reception optical amplifier is boosted to a maximum level and substantially all channels associated with substantially all nodes are indicated by a power level less than the operating range for the number of receivers associated with the particular node in the optical signal received from the star coupler.

* * * * *